Figure 8:
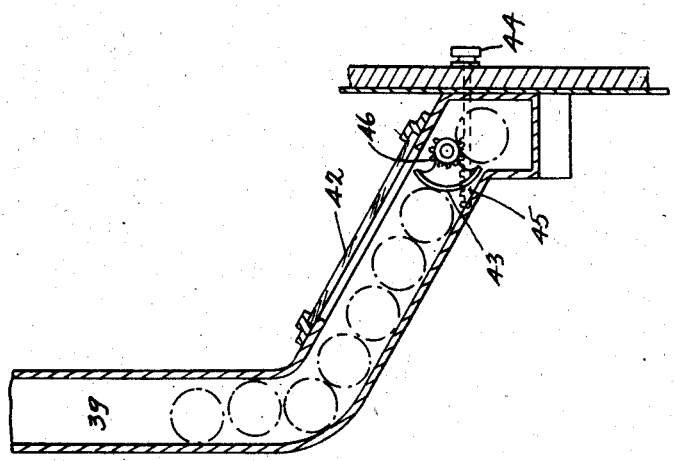

C. MÜLLER & H. REIS.
FRUIT STAND.
APPLICATION FILED JUNE 25, 1907.

973,125.

Patented Oct. 18, 1910.

5 SHEETS—SHEET 1.

Fig. 1.

Witnesses:
James F. Duhamel
F. Allen

Charles Müller,
Henry Reis,
Inventors
By their Attorney
Victor J. Evans

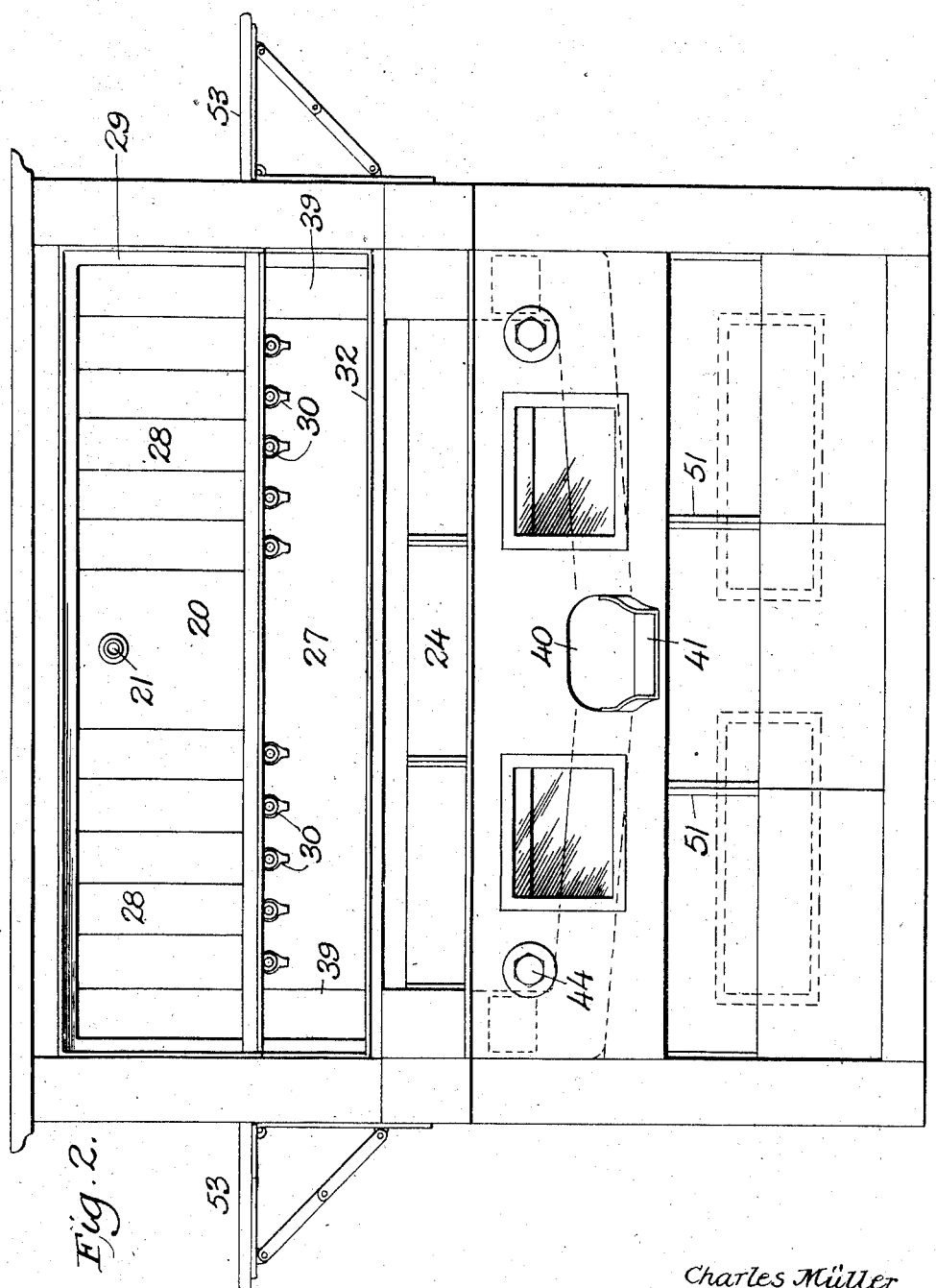

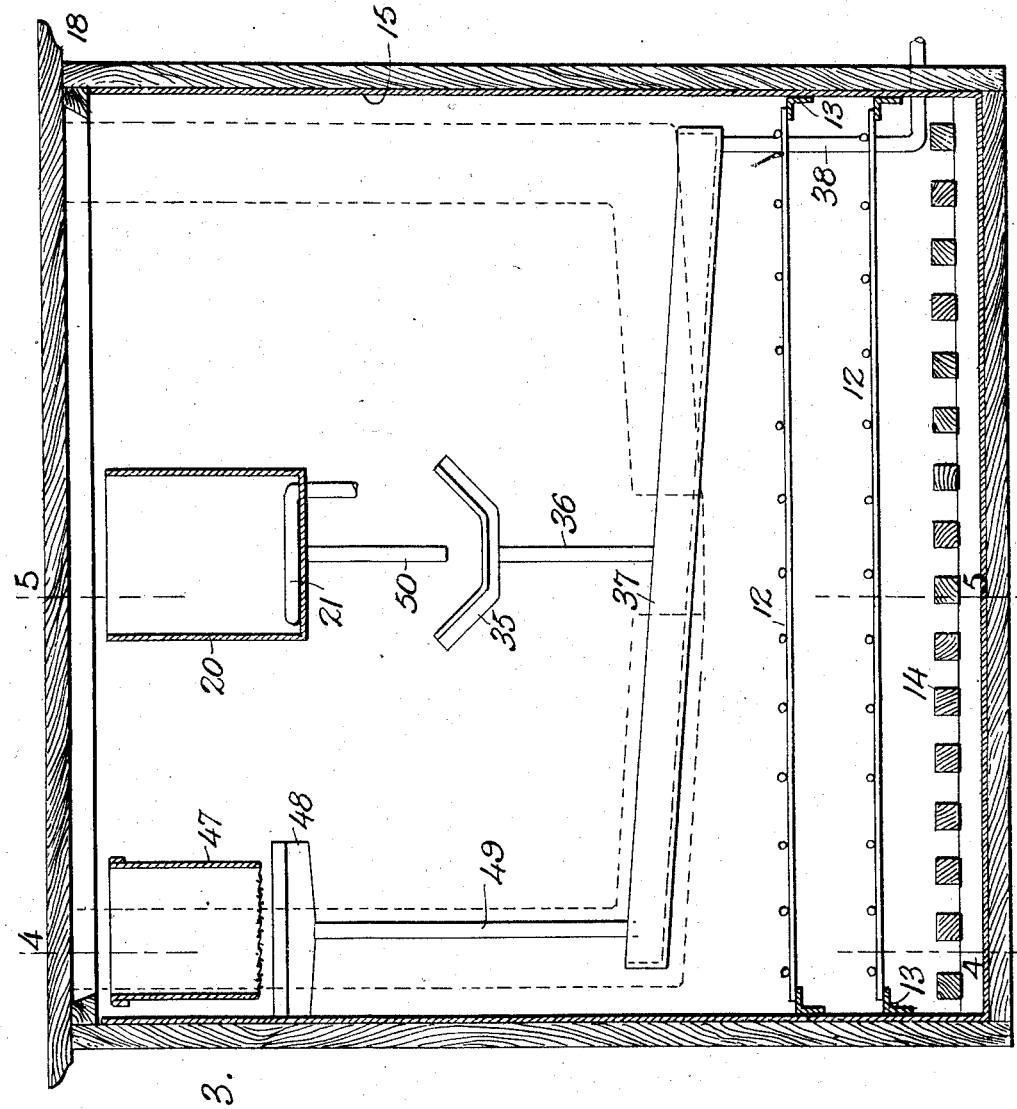

C. MÜLLER & H. REIS.
FRUIT STAND.
APPLICATION FILED JUNE 25, 1907.
973,125.
Patented Oct. 18, 1910.
5 SHEETS—SHEET 4.
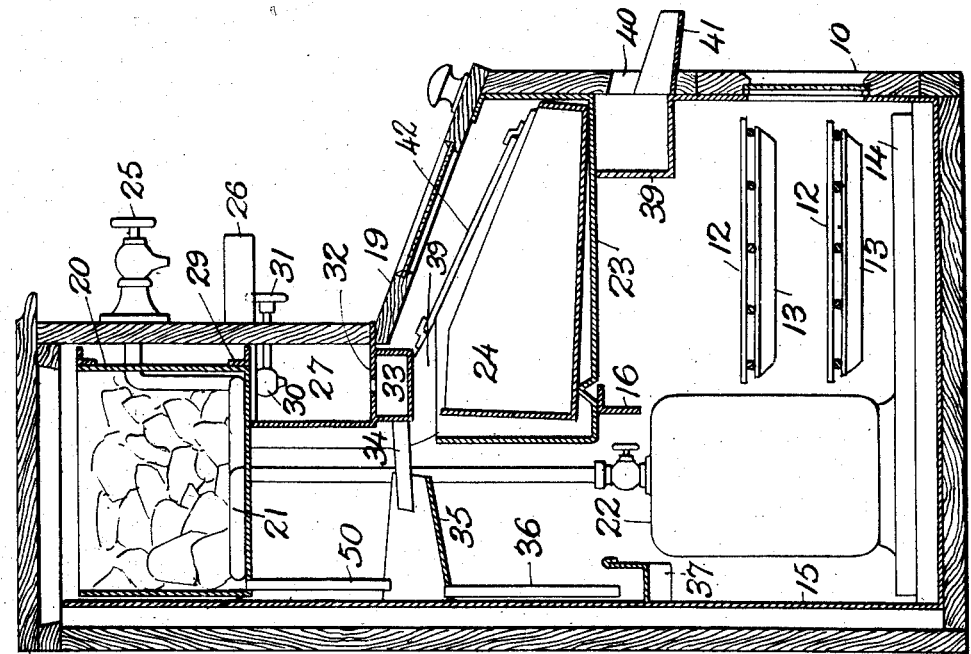
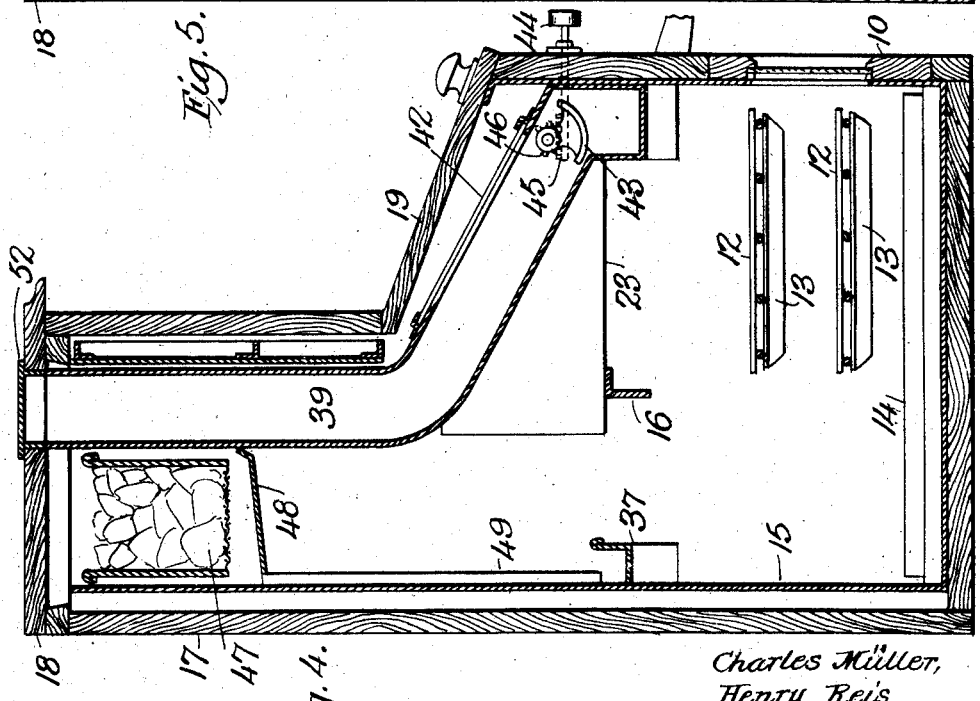
Charles Müller,
Henry Reis,
Inventors

C. MÜLLER & H. REIS.
FRUIT STAND.
APPLICATION FILED JUNE 25, 1907.

973,125.

Patented Oct. 18, 1910.
5 SHEETS—SHEET 5.

Witnesses:
E. L. Jones
A. H. Ste Marie

Inventors
Charles Müller
Henry Reis
By their Attorney
H. C. Karlson

UNITED STATES PATENT OFFICE.

CHARLES MÜLLER AND HENRY REIS, OF NEW YORK, N. Y.

FRUIT-STAND.

973,125.  Specification of Letters Patent.  Patented Oct. 18, 1910.

Application filed June 25, 1907. Serial No. 380,721.

*To all whom it may concern:*

Be it known that we, CHARLES MÜLLER and HENRY REIS, citizens of the United States, residing at New York, in the county of New York and State of New York, have invented new and useful Improvements in Fruit-Stands, of which the following is a specification.

This invention relates to fruit stands and more particularly to devices for the vending of fruits, confectionery and similar articles in which the articles for sale are inclosed within the structure which is provided with cooling means for refrigerating the contents to prevent the destruction of perishable fruits and they are at the same time inclosed against injurious dusts. Means are also provided by which the fruits and other articles may be released and permitted to escape so that handling is avoided and the device is kept closed against the admission of warm air. These and other details of the construction and operation of the device will be more fully described in the following specifications as set forth in the claim.

In the drawings forming a part of this application like reference characters are used to designate the same parts in the various views.

Figure 7:
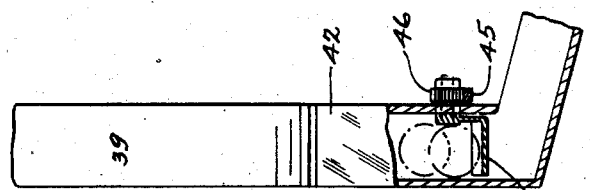
Figure 6:
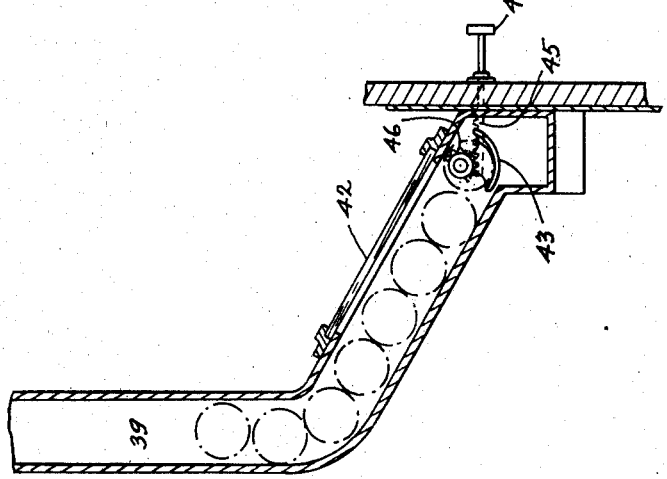

Figure 1 is a perspective view of this fruit stand. Fig. 2 is a front view of the device with part of the front wall removed. Fig. 3 is a longitudinal vertical sectional view. Fig. 4 is a cross sectional view on the line 4—4 of Fig. 3. Fig. 5 is a similar view on the line 5—5 of Fig. 3. Fig. 6 is a sectional side elevation showing that part of the stand which is adapted to contain fruit, and the serving mechanism therefor, with the controlling valve in a closed position. Fig. 7 is a front view of the construction represented by the preceding view; and Fig. 8 is a view similar to Fig. 6, but showing the controlling valve turned so as, first, to segregate the fruit or other article to be served, from what is to remain in the appropriate receptacle of the stand, and, secondly, to deliver the segregated fruit or other article.

This device is constructed to represent a cabinet and is compact in its arrangement, its base being arranged with doors 10 at its front and having a latch 11 to keep them closed. Within these doors are arranged light shelving 12 of wire or similar material and supported by cleats 13. The bottom of this compartment is provided with a grating 14 to support the contents from contact with the floor in case any moisture should accumulate at that point.

The whole of the stand is provided with a sheet metal lining 15 which has openings at various points and a cross bar 16 running the length of the stand on its interior supports certain shelving which will be hereinafter referred to.

The rear of the stand is elevated as at 17 and has a removable cover 18 adapted to slide or be hinged to the structure as may be found desirable, that portion between the main body and the rear extension 17 is provided with a hinged door 19 having glass panels by which the interior may be inspected. While the upper structure is provided with a box 20 in the bottom of which is arranged a coil 21 for soda or aerated beverages carried in a tank 22 and which may be readily connected with the coil 21 or disconnected when it is necessary to remove same.

The cross bar 16 supports a tray 23 made of sheet metal and within same may be arranged several bins 24 for the reception of various articles offered for sale, the contents of which may be easily seen through the openings of the door 19. The outlet of the coil 21 is a faucet 25 beneath which is a drip pan 26 and beneath the ice-box 20 and running the length of the stand is an aperture 27 for the reception of soda glasses while above this aperture and arranged parallel with and alongside of the box 20 are a series of jars 28 containing various extracts of juices to flavor the soda-water. These jars are supported by a frame 29 made of angle iron and set into the front of the upright portion 17 and the lower ends of these jars are provided with discharge cocks 30 controlled by the hand wheels 31 projecting beyond the face of the upright portion 17. The lower wall 32 of the aperture 27 is perforated to allow the escape of any drippings and beneath this wall is a gutter 33 with a spout 34 to deliver the drainings into a receptacle 35 with a drain 36 which delivers any liquid into a trough 37 from whence it is carried through a pipe 38 to the outside of the stand. The draining from the pan 26 also falls upon the flooring 32 and is carried off through the gutter 33.

At each side of the stand is a tube 39, which may be of any desirable cross section and communicates with the top 18. Two such tubes have been shown in the accompanying drawings, but any convenient number may be provided, though they are preferably made in pairs, for a purpose presently to be explained. Each one of said tubes 39 is composed of four parts, or what might be termed functionally differentiated portions, viz.: 1, an upper vertical section designed to let the fruit down rapidly to a point a little above the serving mechanism; 2, a middle section inclined at an angle greater than the angle of repose of the fruit and disposed laterally with relation to the said vertical portion; 3, a perpendicular drop located at the lower end of the said middle section; and 4, a slightly inclined discharge channel leading to the outlet of the fruit-containing part of the stand or cabinet. One outlet will suffice for each pair of tubes 39, the same consisting of an opening 40, at the lower edge of which may be placed a delivery spout 41. It will be observed that the peculiar incline and lateral arrangement of the middle section aforesaid, relatively to the upper vertical portion of the tube, operate to break the combined forces of the momentum and weight of the fruit let down through it and further obviate the crowding of the fruit, which occurs in other known constructions. The incline need not be steep, only such as will afford an effective runway for the fruit, which may be brought over any suitable course, extended in any convenient direction within the cabinet according to capacity desired, down to the serving mechanism, which latter is attached to the lower end of the said middle section. The perpendicularity of the drop in the tube 39, below the serving mechanism, is intended to restore partly the momentum of the fruit arrested by the middle inclined portion and thus give it, so to say, a fresh start down the discharge channel and toward the outlet, to insure quick delivery. However, it is not desirable to have the fruit come down with too much force through the discharge opening and into the delivery spout, and for that reason the said tubes 39 are preferably employed in pairs, as before stated, the lower ends thereof being alined to form opposite inclines, on which the descending fruit may roll up and down until it becomes quiescent and drops out of the outlet 40, common to both inclines.

The serving mechanism comprises an oscillatable valve 43, and a plunger 44 adapted to operate the same, through the medium of a rack-bar 45 and pinion 46. The valve 43 is concavo-convex and placed in the lower end of the said middle section of the tube 39 with its hollow side turned normally toward the fruit descending therein. In this position, the valve will receive the fruit in the manner indicated in Fig. 6 (the circles representing the fruit) and check its descent until operated to release it, the fruit at the bottom of the column lodging one by one in the scoop afforded by the valve, as fast as the latter is returned to normal position. A suitable connection is provided between the stem of the valve 43 and the pinion 46, whereby the valve can be swung in an arc of a circle within the said lower end of the middle section of the tube 39. The pinion 46 is located to one side of the tube and meshes with the rack-bar 45, the latter forming an integral part of the plunger 44, which is slidable in a suitable bearing provided therefor in the front wall of the fruit stand. The rack-bar is located under the pinion, as illustrated. Now, it will be understood that upon pushing the plunger inward, the pinion will be caused to rotate so as to swing the scoop-like valve, with the fruit therein, backward and upward, thereby inverting the valve, dumping its contents into the perpendicular drop of the tube 39, and meanwhile holding up the column of fruit remaining in the said tube, all as indicated in Fig. 8. The return of the plunger and thereto connected valve to their normal position then reëstablishes the conditions that previously obtained, and the remainder of the fruit can be had in the way just pointed out, by similar subsequent operations of the plunger and valve. The front end of the said middle portion of the tube 39 has a glass cover 42, so that its contents may be inspected previously to purchase. The contents, it will be noted, may consist of candies or nuts, as well as deciduous fruits, or other articles which the stand is adapted to vend, and the valve 43 may be made of such size as will release any desired amount of the material being sold.

At one end of the upright 17 is an ice-box 47 with a perforated bottom and beneath this box is a drip-pan 48 communicating with the trough 37 by means of the pipe 49. The box 20 also has an outlet 50 which delivers the waste water to the receptacle 35.

In Fig. 2 the lower part of the stand is shown as being provided with bins or boxes 51 but it is obvious that any desired construction may be resorted to that may be desired. While it may be found convenient to confine the construction of the device to that form illustrated in the drawing occasions may arise when it is found advisable to alter the arrangement of some of these parts without departing from the essential features above described.

Various details may be added for certain conveniences for manipulating the doors. The tubes 39 may be provided with covers 52, and shelves or brackets 53 may be provided at each end of the stand to accommodate the scales, wrapping paper, or other articles, and means provided for the hanging of a bucket or waste basket from these brackets.

The stand may be also provided with certain ornamental features to make the same appear clean and attractive and other sanitary features may be added to preserve the fruit and make it more wholesome. This device provides not only for preservation of fruit but will also keep candy or other articles fresh and free from contamination of outside influences.

What is claimed as new and we desire to secure by Letters Patent is:

In a fruit stand, the combination of a suitable cabinet having a centrally-located outlet and inclosed tubes designed to carry the fruit in single files converging toward the same, each tube including a vertical upper portion extending downwardly into its own end of the cabinet from a covered opening in the top thereof adapted to receive the fruit, a middle section disposed laterally with relation to said upper portion and inclined therefrom at an angle somewhat greater than the angle of repose of the fruit to convey the latter at a reduced rate of speed to a lower forward part of the cabinet, a scoop-like valve located in the lower end of said middle section in position to arrest the fruit therein, a pinion operatively connected with the stem of said valve exteriorly of the tube, a rack-bar engaging said pinion, a plunger integral with said rack-bar, a short perpendicular drop below said middle section, and a slightly inclined channel leading away from said drop, the said plunger, rack-bar and pinion operating to invert said valve and thereby let down the fruit from the middle section into the drop and thence into the channel, and the lower ends of the channels in each pair of tubes being alined and forming opposite inclines by the sides of the central outlet for the fruit rolling out of either tube.

In testimony whereof, we affix our signatures in presence of two witnesses.

CHARLES MÜLLER.
HENRY REIS.

Witnesses:
JAMES F. DUHAMEL,
J. W. LOWELL.